Figure 1:
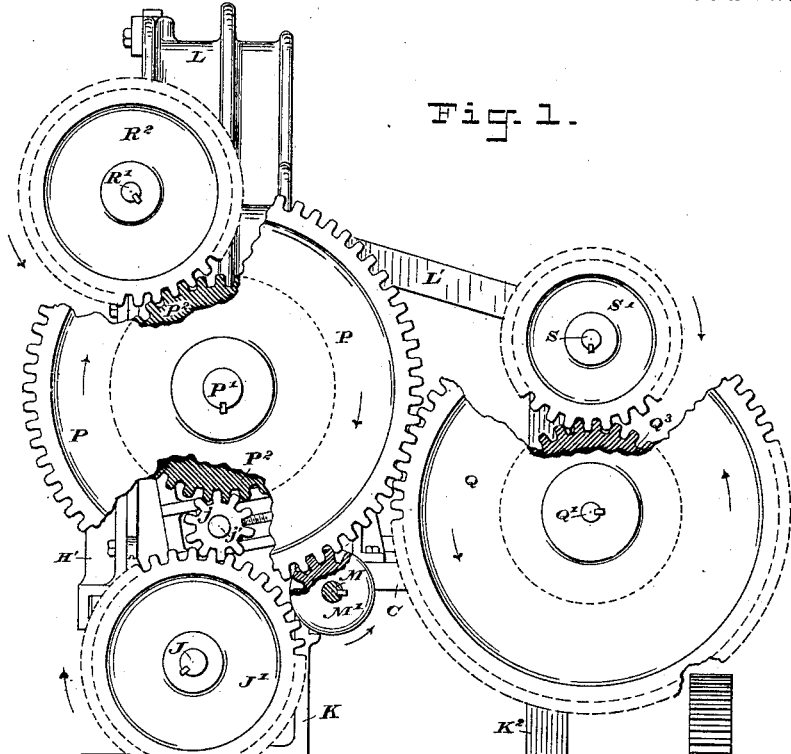

(No Model.) 6 Sheets—Sheet 1.

J. RUSSELL.
MACHINE FOR MAKING TIMBER HANGERS.

No. 359,099. Patented Mar. 8, 1887.

WITNESSES:
Geo. H. Fraser
Geo. Dawson

INVENTOR:
Jacob Russell
By his Attorneys,
Burke, Fraser & Bennett (No Model.) 6 Sheets—Sheet 2.

J. RUSSELL.
MACHINE FOR MAKING TIMBER HANGERS.

No. 359,099. Patented Mar. 8, 1887.

WITNESSES
Geo. H. Fraser.
Geo. Bainton

INVENTOR:
Jacob Russell
By his Attorneys,
Burke, Fraser & Bennett (No Model.) 6 Sheets—Sheet 3.

J. RUSSELL.
MACHINE FOR MAKING TIMBER HANGERS.

No. 359,099. Patented Mar. 8, 1887.

WITNESSES
Geo. H. Fraser.
Geo. Bainton

INVENTOR:
Jacob Russell
By his Attorneys,
Burke, Fraser & Bennett

N. PETERS. Photo-Lithographer, Washington, D. C.

(No Model.) 6 Sheets—Sheet 4.
J. RUSSELL.
MACHINE FOR MAKING TIMBER HANGERS.
No. 359,099. Patented Mar. 8, 1887.
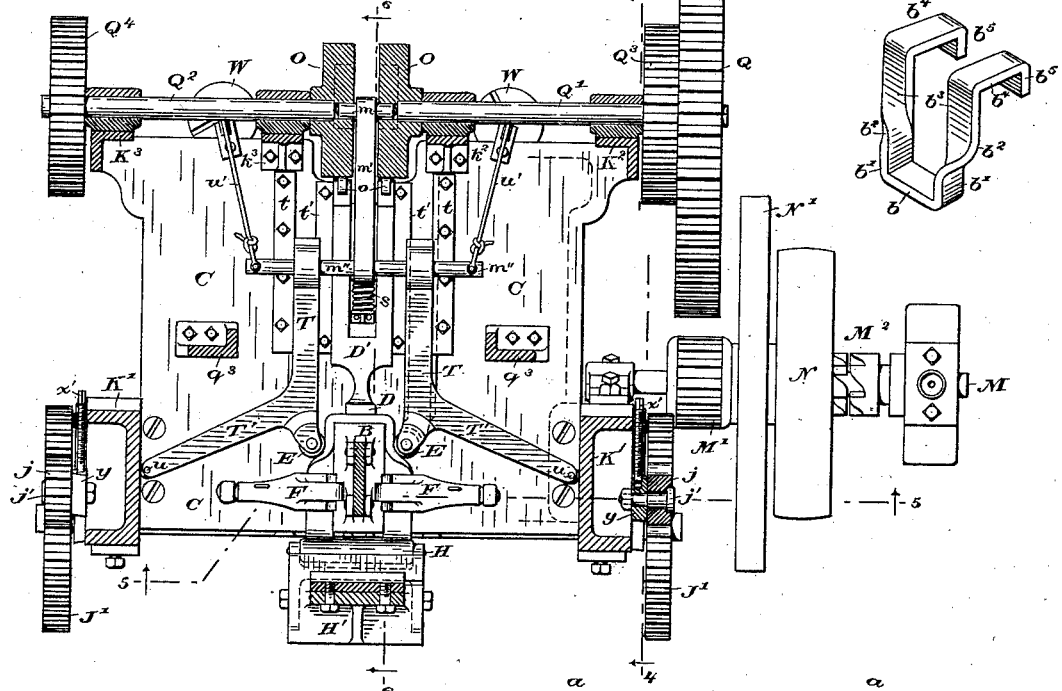
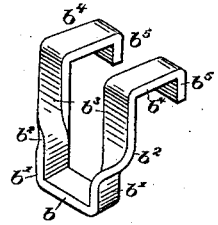
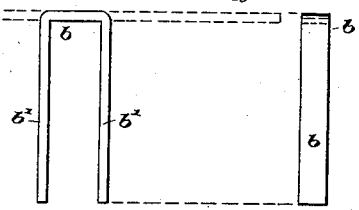
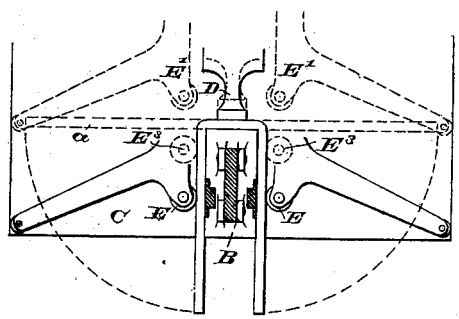
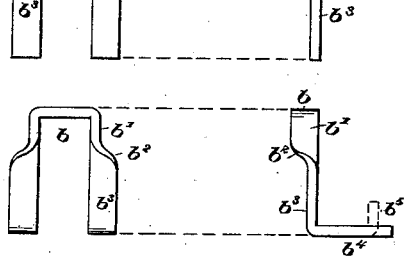
WITNESSES:
Geo. H. Fraser.
Geo. Bainton
INVENTOR:
Jacob Russell
By his Attorneys,
Burky Fraser & Connett
N. PETERS, Photo-Lithographer, Washington, D. C.

(No Model.) 6 Sheets—Sheet 5.
J. RUSSELL.
MACHINE FOR MAKING TIMBER HANGERS.
No. 359,099. Patented Mar. 8, 1887.
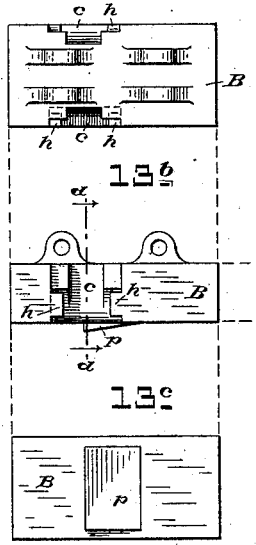
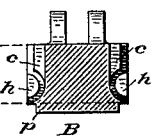
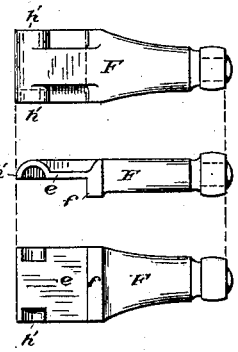
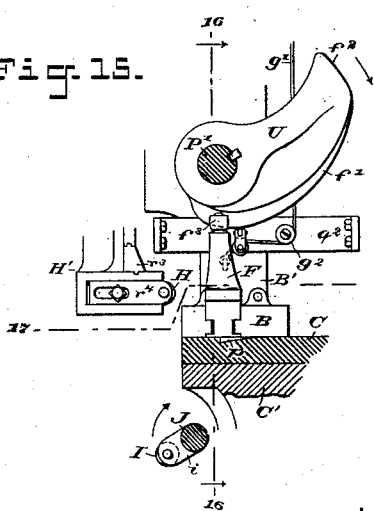
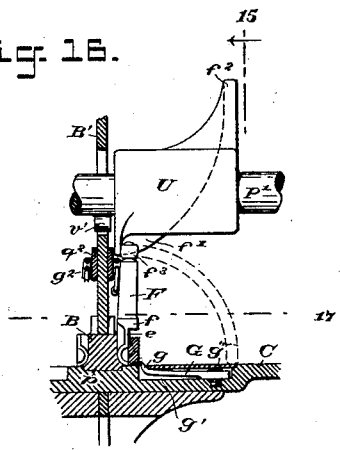
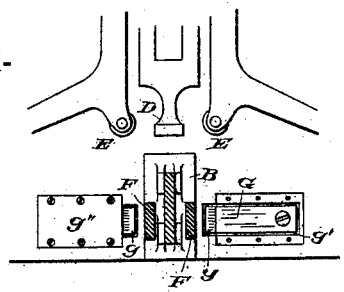
WITNESSES:
Geo. H. Fraser.
Geo. Bainton
INVENTOR:
Jacob Russell
By his Attorneys,
Burke Fraser Bennett
N. PETERS, Photo-Lithographer, Washington, D. C.

(No Model.) 6 Sheets—Sheet 6.

J. RUSSELL.
MACHINE FOR MAKING TIMBER HANGERS.

No. 359,099. Patented Mar. 8, 1887.

WITNESSES:
Geo. H. Fraser.
Geo. Dainton

INVENTOR:
Jacob Russell
By his Attorneys,
Burke, Fraser & Bonnett

UNITED STATES PATENT OFFICE.

JACOB RUSSELL, OF BROOKLYN, NEW YORK.

MACHINE FOR MAKING TIMBER-HANGERS.

SPECIFICATION forming part of Letters Patent No. 359,099, dated March 8, 1887.

Application filed March 25, 1886. Renewed February 7, 1887. Serial No. 226,800. (No model.)

*To all whom it may concern:*

Be it known that I, JACOB RUSSELL, a citizen of the United States, residing in the city of Brooklyn, in the county of Kings and State of New York, have invented certain new and useful Improvements in Machines for Making Timber-Hangers and other Similar Articles, of which the following is a specification.

My invention provides a machine for automatically and rapidly making metal timber-hangers, commonly called "bridle-irons," which are bent from a flat bar of iron and are chiefly used for supporting the ends of floor-timbers where they abut against the sides of other timbers. Such hangers as heretofore turned out by hand have been constructed of flat bar-iron in U shape with the sides or legs twisted with a quarter-twist, the ends then turned down at right angles, and the extreme ends again turned at right angles parallel with the U portion. The turned-down ends hook over the top of a floor-beam and the end of the abutting beam drops into the pendent U portion. So far as I am aware these timber-hangers have always been made by hand on an anvil, although a hand-machine was patented some years ago for facilitating their production. This machine had a sectional die, around which the straight flat bar was bent by the successive movement of pairs of bending-levers moved separately by hand. When the hanger was completed, the die was taken apart in order to be able to get the finished hanger out.

My improved machine is designed to perform all the necessary operations automatically, with the exception of the feeding in of the flat bars of heated iron and the lifting off of the finished hangers.

Figure 2:
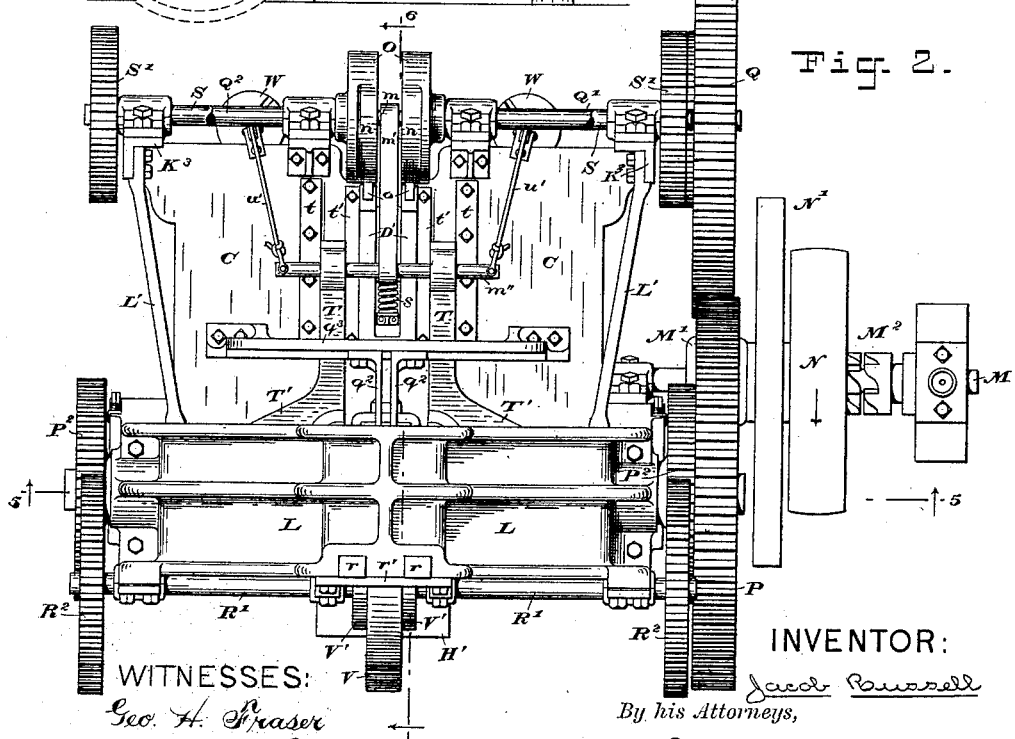
Figure 3:
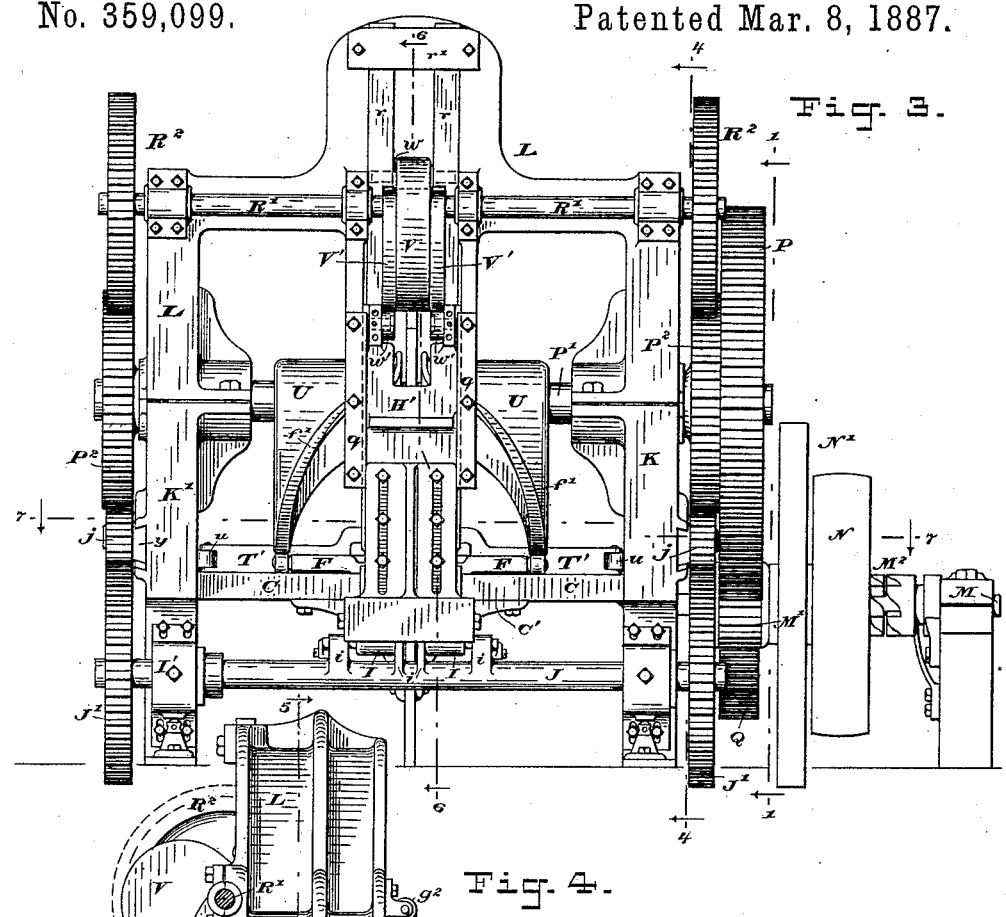
Figure 4:
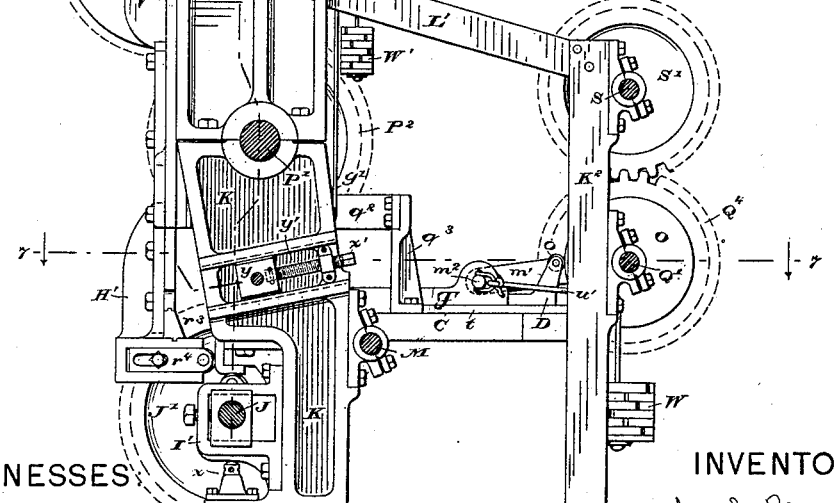
Figure 5:
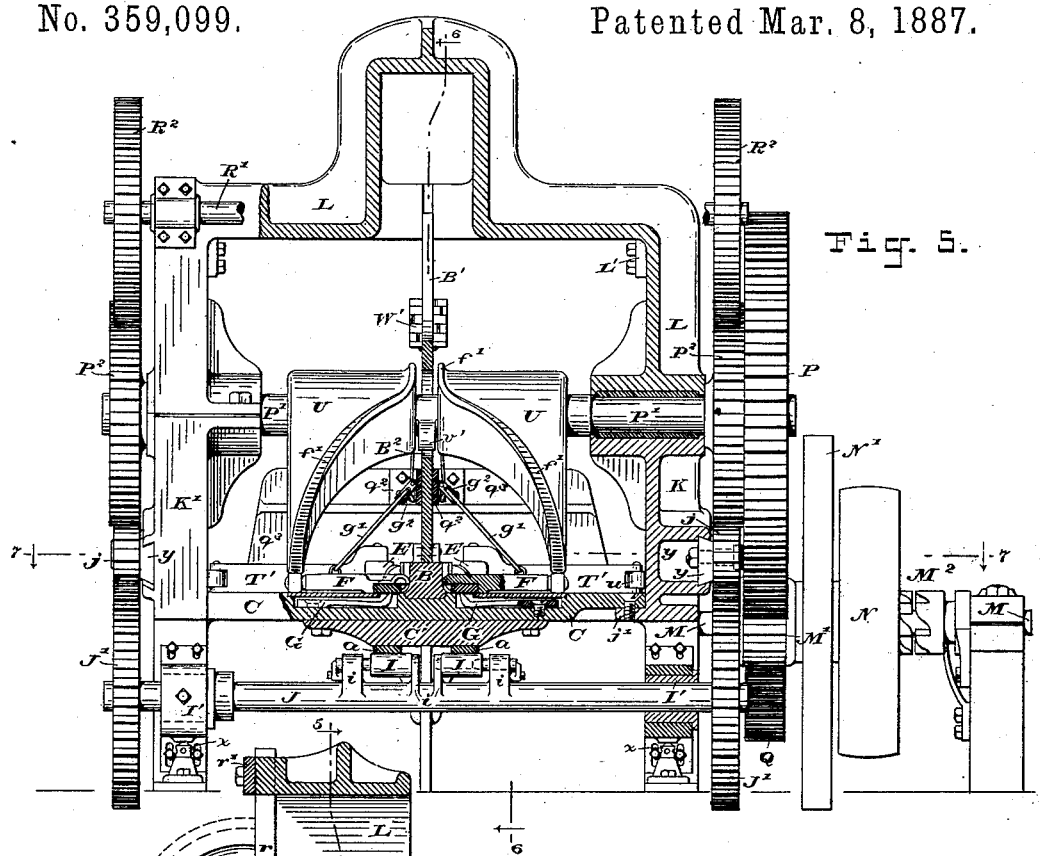
Figure 6:
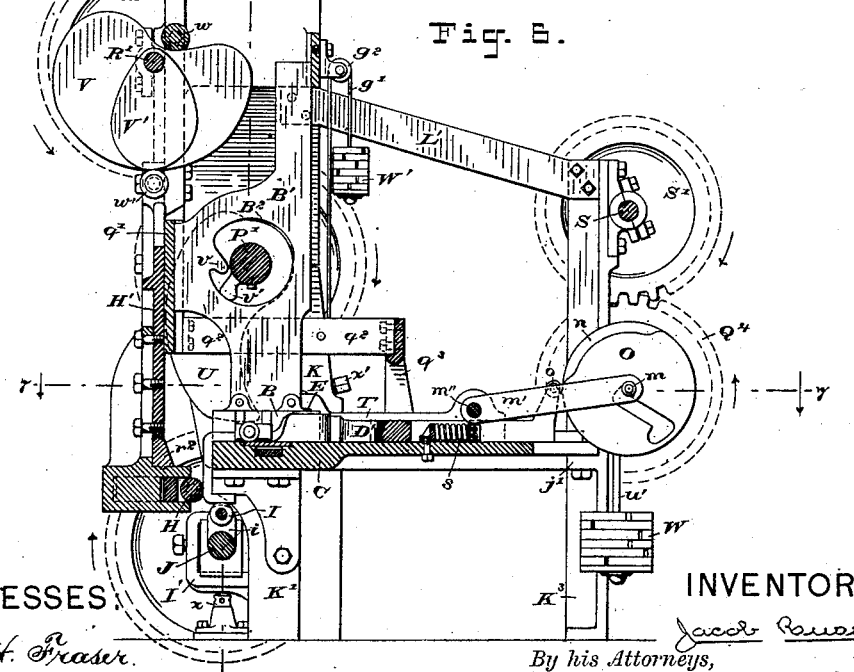

Figure 1 of the acompanying drawings is a side elevation of my machine, partly in section, on line 1 1 in Fig. 2. Fig. 2 is a plan thereof. Fig. 3 is a front elevation. Fig. 4 is a side elevation similar to Fig. 1, but partly in section cut along the line 4 4 in Figs. 2 and 3. Fig. 5 is a front elevation similar to Fig. 3, but partly in vertical section cut in general along the line 5 5 in Figs. 2, 4, and 7. Fig. 6 is a vertical section looking in the same direction as Figs. 1 and 4 and cut in the plane of the line 6 6 in Figs. 2, 3, 5, and 7. Fig. 7 is a plan, partly in horizontal section, on the line 7 7 in Figs. 3, 4, and 6. Fig. 8 is a fragmentary plan, showing the die and first bending-rollers. Figs. 9, 10, and 11 show the successive steps in making the timber-hanger. Fig. 12 shows the finished hanger in perspective; and the remaining figures are detail views, which will be described hereinafter.

I will first describe the manipulations through which the bar of iron passes in being converted by my machine into the finished article.

The straight bar $a$ (shown in dotted lines in Fig. 9) is first bent into a U, as shown in full lines, having a middle portion, $b$, and legs $b'$ $b'$. At the next operation its legs are twisted at $b^2$ $b^2$, as shown in Fig. 10, their end portions, $b^3$ $b^3$, beyond the twist, being thus turned down flat. At the next operation these flattened ends $b^3$ are bent over at right angles, as shown in full lines at $b^4$ $b^4$ in Fig. 11, and, finally, the extreme end portions of these ends are again turned at right angles, as shown in dotted lines in Fig. 11, forming hooks $b^5$ $b^5$. The timber-hanger A is then complete, as shown in Fig. 12.

I will now describe the various tools and devices in my machine which immediately act upon the bar of iron to perform these successive manipulations, ignoring for the present the mechanism by which the necessary relative movements are given to these tools and devices.

The bar is bent around a die, B, and table C. The table is stationary, being a part of the frame-work of the machine. The die B normally rests upon the table, but is lifted therefrom at intervals.

Fig. 8 shows the die B and table C in plan. The bar of iron is first passed in endwise from the left side of the machine to the position shown in dotted lines. Then a plunger, D, in the rear moves forward from the position shown in dotted lines to that shown in full lines and clamps the middle of the bar firmly against the rear of the die. E E are two bending-rollers, which have a forward-and-backward movement. They stand at the commencement in the position indicated by dotted lines at E' E' in Fig. 8. As soon as the bar is clamped by plunger D they begin to move forward, and, encountering the bar, they bend it around the rear corners of the die until the ends project to the front, as shown in full lines in Fig. 8. In order that the bar shall lie firmly and truly against the sides of the die, these rollers continue to move forward until they reach the position shown in full lines in this figure. They then move back half-way to the point shown in dotted lines at E³ E³ in Fig. 8, as shown in full lines in Fig. 7. Here they stop and act to hold the bar in place while it is undergoing the next operation.

To the opposite sides of the die B are pivoted twisting-levers F F. The relative constructions of the die and levers can be understood by an examination of Figs. 13 and 14. Fig. 13 includes four views of the die, 13ᵃ being a plan, 13ᵇ a side elevation, 13ᶜ a bottom view, and 13ᵈ a section on line d d. Fig. 14 includes three views of the twisting-lever, 14ᵃ showing it in plan, (when turned down flat,) 14ᵇ in front view, and 14ᶜ in bottom view, (when turned down.)

Fig. 15 is a fragmentary side elevation of the twisting mechanism, &c., showing the lever F turned up. Fig. 16 is a fragmentary front elevation thereof, partly in vertical section, and Fig. 17 is a fragmentary plan, partly in section, on line 17 17 in Figs. 15 and 16.

In each side of the die B is a recess, c, which receives the lever F. A half-round pivot, h, projects into this recess from each side. The lever F is formed with half-round eyes or sockets h' h', (shown in Figs. 14ᵇ and 14ᶜ,) which engage the half-round pivots. Thus the lever is pivoted to the die with its pivotal axis in the plane of the side of the die. When the lever is turned up vertically its surface e is flush with the side of the die. Its pivotal axis is as high above the surface of the table as the thickness of the iron bar to be operated upon, so that when the lever is turned down the surface e squeezes the bar flat against the surface of the table C. A projection, f, is formed on the lever at a height above the table, when the lever is turned up, equal to the width of the iron bar to be operated upon plus its thickness.

The levers F F are turned up before the bar a is first inserted in the machine and remain in that position during the movement of the rollers E E forward and back to position E³. The legs of the U-shaped bar are thus bent against the surfaces e on the levers. Thus the levers are shut in, as it were, by the bent bar.

As soon as the rollers E E have moved back to the position E³, as described, and stopped there, the levers F F begin to turn down, as denoted in the fragmentary front view, Fig. 16, thus twisting the bar just in front of where it is held by the rollers E E, and finally laying it down flat upon the table C, as is best shown in Fig. 5. At this time the bar is held laterally between the side of the die B and the projection f on the lever F, which, owing to the position of the pivotal axis, have been approaching each other while the lever was turning down. The described location of this pivotal axis is important to the correct working of the machine, as it preserves the corners of the bar and keeps the inner edges in line on both sides of the twist. The projection f acts to keep the bar in line and to prevent its turning up or becoming otherwise displaced during the twisting, and finally forces it laterally against the die.

In order to prevent forcing the bar bodily outward as the levers F turn down, instead of twisting it, I provide some sort of device for holding the lower edge of the bar in close against the side of the die. Any suitable projection or rib on the table that will not interfere with the first bending of the bar by the roller E, nor with the flattening of the bar down against the table after twisting, may be used for this purpose. I prefer to employ a catch or pawl, g, which has a vertical movement, is beveled on one side and abrupt on the other, and kept normally pressed up by a spring or weight. As the bar is bent in against the die it wipes over the beveled side of this catch, pressing it down, and when it has passed over the catch rises again, presenting its abrupt face against the lower edge of the bar to prevent the return of the latter. In my preferred construction this catch is the turned-up end of a flat leaf-spring or spring-plate, G, which is fastened down in a recess, g', in the top of the table, and this recess is covered over by a plate, g'', except at the end where the catch g projects, all as clearly shown in Fig. 17, where the plate g'' is removed from the recess on one side. Fig. 16 shows the catch g projecting up and holding the lower edge of the bar a in place. Fig. 5 shows the catch pressed down after the bar has been twisted.

The levers F F, after having twisted the bar, are held down upon it for a moment, thus keeping it clamped down fast to the table. While it is so held, a roller, H, (or pair of rollers,) arranged at the front of the machine and having a vertical movement, descends from its normal position, (shown in Fig. 15, and striking the projecting ends of the bar bends them downward against the front of the table C, and continuing its movement until it reaches the position shown in Fig. 6. As it reaches this lower position a roller or pair of rollers, I I, strikes the downwardly-projecting ends of the bar and turns them under the table, as clearly shown in Fig. 6. One roller might be used in place of the two rollers I I. The roller H remains down and holds the ends of the bar firmly against the front of the table until the rollers I I have engaged them and commenced to bend them under. The roller H may then commence its upward movement and will resume its normal position. The rollers I I are mounted on radial arms i i, projecting from a rotary shaft, J, arranged just beneath the front edge of the table. Theoretically, this roller I should move in a straight horizontal line, front and back, in similar manner to the roller H; but for practical reasons I prefer the construction shown. This last operation completes the timber-hanger.

In Figs. 1 to 7 the machine is shown in the position of having just finished the hanger.

At the next instant all the parts return, either simultaneously or successively, to their normal positions. The rollers E E move back, the roller H moves up, the roller I moves beyond the ends of the hanger, the twisting-levers F F turn up, and the plunger D moves back. The die B is then lifted bodily above the table C, high enough to permit the finished hanger to be slid out beneath it. A workman then pulls the hanger off from the front of the machine. The die then descends to its place, a new bar, $a$, is inserted, and the operation is repeated.

The parts and features thus far described constitute the most important and essential portions of my invention. The mechanism for imparting the requisite successive movements to these parts is of secondary consequence, and may be varied or modified in many ways. In fact, there are several different ways of accomplishing each of the movements which are required in my machine. I will now proceed to describe the driving mechanism and frame-work when constructed as shown in the drawings, remarking, however, that while I prefer this construction as being the best for the purpose of which I am now aware, yet I do not by any means confine myself to it.

The fixed frame-work of the machine consists of four upright side frames, K K' in front and $K^2 K^3$ in the rear, and a top frame, L. The top frame is of inverted-U shape, and is mounted on the frames K K' and connected by tie-bars L' L' with the rear frames, $K^2 K^3$. The frames K K' $K^2 K^3$ have ledges $j' j'$, (best shown in Figs. 5 and 6,) on which rests the table C, and to which it is bolted. The table is made thicker and heavier in front than at the rear.

M is the driving-shaft, having a pinion, M', keyed on it and a clutch-sleeve, $M^2$, splined on it, so that it may slide. A pulley, N, and its fly-wheel N' turn loosely on this shaft until clutched thereto by moving the clutch $M^2$ toward the toothed boss or hub of the pulley, whereupon they engage, and the shaft M is carried around with the pulley N for one revolution of the machine, at the completion of which the clutch is automatically disconnected by mechanism which I have not deemed it necessary to show, as it possesses no novelty. Such "one-revolution clutches" are well known, being used in drop-presses and various other machines.

The pinion M' drives a large gear, P, on a shaft, P'. The gear P meshes with another gear, Q, of equal size on a shaft, Q'. The shaft P' passes through bearings, Fig. 5, at the junction of the frames K and L on one side and K' and L' on the other. Just outside of the bearings it has gears $P^2 P^2$ fixed on it, which mesh with equal-sized gears $R^2 R^2$ on a shaft, R', above, which crosses in front of the upper portion of the frame L. The gears $P^2 P^2$ also mesh with idler-pinions $j j$, which in turn mesh with gears J' J' on the opposite ends of the shaft J.

The shaft Q', driven by the large gear Q, extends only about half-way across the rear of the machine. It is there interrupted, and a shaft, $Q^2$, is arranged in line with it, extending across the other half of the machine. These shafts have bearings attached to the frames $K^2$ and $K^3$ and to brackets $k^2 k^3$, bolted to the table C. Above these shafts is a counter-shaft, S, (the middle portion of which is broken away in Fig. 2 to show the parts beneath,) and on the opposite ends of this shaft are gears S' S'. A gear, $Q^3$, on the shaft $Q^2$ meshes with one gear S' and drives the shaft S, and the other gear S' meshes with a gear, $Q^4$, on the shaft $Q^2$, which it consequently drives. As the gears $Q^3 Q^4$ are of like size, and the gears S' S' are also equal, the shaft $Q^2$ is driven at the same speed with the shaft Q'.

All the shafts, P', Q', $Q^2$, R', and J, rotate at uniform speed. To each revolution of these shafts one timber-hanger is bent and finished.

Figure 18:
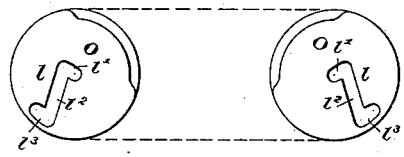

The shafts Q' and $Q^2$ approach each other only as far as shown in Fig. 7. On their ends are fixed two disk-cams, O O, of peculiar construction. Each has a groove, $l$, which starts at the center, extends radially a short distance, forming a notch, $l'$, then turns at nearly right angles and extends in a straight line, $l^2$, almost to the periphery, and then turns again nearly at right angles, forming a notch, $l^3$. Fig. 18 shows the two cams O O with their grooved faces turned outwardly into a single plane. Their grooves $l l$ are relatively reversed, so that when the cams are set face to face the grooves coincide. The cams are set far enough apart to admit freely between them a connecting-bar, $m'$, carrying a cross-head or pin or pair of rollers, $m$, at its one end, and jointed at its other end to a sliding frame, T, which slides longitudinally on the table C, and carries the bending-rollers E E. This frame is composed of two longitudinal bars connected together at their rear ends by a cross-rod, $m''$, to the middle of which the bar $m'$ is jointed. These longitudinal bars slide between cleats or guides $t t t' t'$ on the table C, and at their front ends they carry the rollers E E. From the front ends of the longitudinal bars brace-bars T' T' extend laterally toward the sides of the machine, and each bears at its end a roller, $u$, which rollers ride against the inner surfaces of the frames K' or other convenient part of the machine. These are to resist the outward thrust, tending to separate the rollers E E, and which otherwise would be apt to bend the longitudinal bars out of line.

Figure 19:
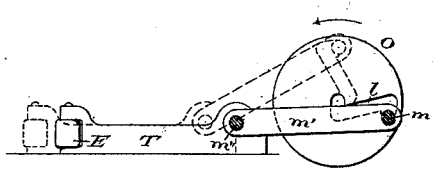

The cross-head or pin $m$, at the rear end of the connecting-bar $m'$, projects to both sides thereof and enters the grooves $l l$ in both disk-cams O O. One of these cams and its driving shaft and gearing might be omitted; but I prefer to use both because of the avoidance of side strains. The operation is as follows: At starting, the parts stand as shown in full lines in Fig. 19. The frame T is drawn fully back and the pin $m$ rests in the notches $l^3$ of the two grooves $l l$. When the machine is started the cams turn in the direction of the arrow, and the pin $m$ is lifted and carried around like a crank-pin, thus moving the slide T forward. The dotted lines in Fig. 19 show the parts after a quarter-revolution, the slide having moved half-way forward. When a half-revolution is completed the parts are in the position shown in full lines in Figs. 8 and 20. As soon as the cams turn far enough to relieve the push against the pin $m$ the latter drops into the straight portion $l^2$ of the groove.

Figure 20:
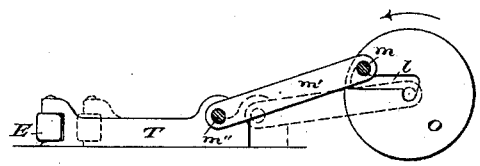

Weights W W are attached by wire ropes $w'\ w'$, or other connections, to the frame T, and their tension acts to move back the frame when the pin $m$ is thus released, the pin during this backward movement sliding freely in the grooves $l^2\ l^2$ until they are stopped by the rear ends thereof, whereupon they drop into the notches $l'\ l'$, as shown in dotted lines in Fig. 20. This is the position $E^3$ shown in full lines in Fig. 7. Here the slide dwells while the cams O O are completing their rotation and until the cams reach the position shown in full lines in Fig. 19, when the pin $m$ drops again out of the notches $l'$ and slides rearwardly through the portion $l^2$ of the grooves to the end thereof and drops into the notches $l^3$. The cams then stop, the parts having been brought back to the starting position, and remain stationary until the next bar $a$ is fed in, whereupon the attendant will start the machine again.

The plunger or clamp D is mounted on or made in one piece with a slide, D', which moves longitudinally between the cleats or guides $t'\ t'$, and which is bifurcated, and on the rear ends of its bifurcations carries rollers $o\ o$, which roll against the peripheries of the cams O O. These cams are formed with depressed cam portions $n\ n$ in their peripheries. A spring, $s$, tends to press the frame D' backward, and when the rollers $o\ o$ encounter the depressions $n\ n$ the frame is pressed back by this spring, the rollers thus entering the depressions. As the end of the depressions passes the rollers the frame is pressed forward again, thus causing the plunger D to clamp the work.

The twisting-levers F F are turned down by cams U U on the shaft P'. These cams are of peculiar shape, each having a quick spiral working-face, $f'$, which commences at the hub, where it engages the lever F when the latter is elevated, and which, as the shaft P' is revolved and the lever F turned down, follows the movement of the end of the lever until the latter is fully down, when the cam becomes concentric at $f^2$, to hold the lever down during the requisite time. The end of the lever F is provided with a roller, $f^3$. When the levers F F are released by the cams U U they fly up to the vertical position again, being drawn up by springs, or, preferably, by cords or chains $g'\ g'$, which pass up and over pulleys $g^2\ g^2$, and are attached to a weight, W', all as best shown in Figs. 5, 6, and 15.

The die B is fastened to the bottom end of a vertical slide, B', which is arranged in a longitudinal plane and slides in vertical guides, as shown in Fig. 6. There is an opening, $B^2$, in this slide, through which the shaft P' passes. A projection, $v$, is formed on the slide entering this opening. On the shaft P' is a tooth, $v'$, which, at each revolution of the shaft, takes under the projection $v$ and thus lifts the slide B' and again drops it. Thus the die is lifted off the table to enable the finished article to be removed. The opening $B^2$ is circular and concentric with the shaft P', and the tooth $v'$ in its rotation bears against the margin of the opening. As the tooth passes to the lower side it acts to hold down the slide B' and die B during the bending operations. The die B has a beveled projection, $p$, on its under side, (see Fig. 13,) which does not interfere with the drawing forward beneath it of the finished hanger, but which, when down in place, enters a socket in the table C, in the manner shown in Fig. 15, and thus resists the forward thrust against the die, which occurs while the rollers E E are making the first bend.

The roller H is carried in a vertical frame, H', at the front of the machine. This frame slides up and down, being confined in grooves in guides $q\ q$. The upper part of the frame H' is divided into two vertical sliding bars, $r\ r$, which slide in recesses in the front of the fixed frame L, being held therein by a plate, $r'$. The guides $q\ q$ are attached at their upper ends to the frame L, and their lower portions are connected together by a web or plate, $q'$, extending across behind the frame H'. The front ends of two longitudinal bars, $q^2\ q^2$, are attached to this plate, and they extend thence back (embracing the slide B' between them) and are attached to a cross-frame or bridge, $q^3$, the ends or legs of which are attached to the table C. Thus the guides $q\ q$ for the frame H' are kept from yielding or springing in a forward direction under the strain that is brought upon this frame while the roller H is doing its work.

The shaft R' has a middle cam, V, and two side cams, V' V', fixed on it, working between the bars $r\ r$ of the frame H'. Between these bars a roller, $w$, is pivoted. The middle cam, V, engages this roller, to lift the frame and hold it elevated. The cams V' V' act upon rollers $w'\ w'$, pivoted lower down in the frame H', to force the frame down to its work at the proper time. The top frame, L, of the machine is carried higher in the center to let the cams V V' pass.

It will be understood that the machine, when started, executes one revolution and then stops. During the revolution one complete timber-hanger has been formed. The machine remains stationary until the finished hanger is removed and a new bar inserted, when the attendant starts it again, and it makes another revolution.

It is desirable to be able to adjust the machine to make hangers of different sizes. For this purpose I provide a series of adjustments as follows: The die B is removed and another of the desired size is put in its place. The cams U U (which should be splined on their shaft) are slid toward or from each other, to adapt them to the altered distance apart of the levers F F. The roller H is set higher or lower by shortening or lengthening its frame H', which is made telescopic, as shown best in Fig. 6. A filling-piece, $r^2$, is set into the frame to take the greater strain off the bolts. When the roller is set higher or lower this piece is removed and replaced by another of different height. The roller H is adjusted toward or from the table C by a slide, $r^4$, which moves horizontally forward or backward across the lower portion of the frame H'. The thickness of the table requires to be varied, for which purpose a plate, C', is bolted beneath it to bring it to the proper thickness, and when the size is to be changed this is replaced by a plate of different thickness. To effect a corresponding adjustment of the rollers I I the shaft J must be raised or lowered. For this purpose it is mounted in bearings I' I', which are connected to the frames K K' by bolts and slots, so that they may be raised or lowered. Screws $x$ $x$ are arranged beneath by which to raise them. This movement of the shaft J is impracticable unless some change be made in the gearing. For this purpose I make the idler-pinions $j$ $j$ movable laterally. Each of these pinions is pivoted on a pin, $j'$, Fig. 7, which is fixed to a block, $y$, sliding in a dovetail, $y'$, Fig. 4, and moved by a screw, $x'$. To raise the shaft J, it is necessary to move the pinion $j$ to the rear.

My machine may be modified in many ways without departing from its essential features. For instance, in order to permit the removal of the hanger, the table might drop from beneath the die instead of the die lifting from the table. The rollers E H I might be substituted by rounded parts acting in the same manner, but not revolving.

The only portion of the table C that is essential to my invention is the portion upon and around which the metal bar is twisted and bent. All the remainder of the table might be cut away without essentially altering the machine. The die B, although preferably a solid block or anvil, may be made in two or more pieces, if preferred, and it may even be made in part solid with the table; but the construction shown is considered the best.

I make no claim to bending the hanger around a die and over and under the edge of a table, nor to holding the bar close to the twist while the twist is being made; nor do I claim the plunger D for holding the middle of the bar against the die.

What I claim as new, and desire to secure by Letters Patent, is, in a machine for making timber-hangers and other similar articles, the following defined features and combinations, namely:

1. The combination of a table, C, a die, B, around which the bar is bent, distinct from said table, normally in place thereon during the bending of the bar and movable bodily out of the way of the bar when the bending is completed, mechanism for so moving the die, bending devices for bending the bar around said die, and bending devices for bending the bar under the edge of the table, substantially as specified, whereby the finished article may be removed by drawing it toward the edge of the table without encountering the die.

2. The combination of a stationary table, C, a die, B, normally resting thereon, and bending rollers or devices for bending the bar around said die and table, with mechanism for lifting said die clear from said table upon the completion of the bending operations, substantially as set forth.

3. The combination, with table C and die B, of bending rollers or devices E E, adapted to move back and forth along the opposite sides of the die, and mechanism for moving them first fully forward and then part way back, holding them stationary for a time, and finally moving them back to their original position, substantially as set forth.

4. The combination, with table C and bending-rollers E E, of the die B, adapted to be lifted from the table, and having a projection, $p$, which engages a shoulder on the table, whereby the forward strain against the die during the operation of bending by the rollers E E is transferred to the table, substantially as set forth.

5. The combination, with table C and die B, of bending rollers or devices E E, adapted to move back and forth along the sides of the die, with mechanism for so moving them and for holding them at rest in position to hold the bar while it is being twisted, and twisting-levers F F, adapted to turn down laterally upon the table, substantially as set forth.

6. The combination, with table C and die B, adapted to be lifted from the table, of twisting-levers F F, pivoted to the opposite sides of the die and adapted to turn down against the table and to be lifted with the die, substantially as set forth.

7. The combination, with table C and die B, the latter having recesses $c$ $c$ in its sides, of twisting-levers F F, pivoted to turn outwardly down against the table and arranged to stand in said recesses when turned vertically with their lateral working-faces flush with the sides of the die, substantially as set forth.

8. The combination of die B, formed with recesses $c$ $c$ in its opposite sides, and half-pivots $h$ $h$, with the twisting-levers F F, adapted to enter said recesses and formed with half eyes or sockets $h'$ $h'$, engaging said half-pivots, substantially as set forth.

9. The combination, with table C and die B, of twisting-levers F F, each pivoted on an axis in the plane of the side of the die and at a height above the surface of the table equal to the thickness of the bar to be operated upon, substantially as set forth.

10. The combination, with table C and die B, of twisting-levers F F, each pivoted on an axis in the plane of the side of the die at a height above the table equal to the thickness of the bar to be operated upon and each formed with a projection, $f$, at a distance from the pivotal axis equal to the width of said bar, substantially as set forth.

11. The combination, with the die B, table C, and twisting-levers F F, of projections from the table adapted to engage the bottom edge of the bar and hold it against the die during the twisting operation, substantially as set forth.

12. The combination, with the die B, table C, and twisting-levers F F, of catches or pawls $g\,g$, projecting from the table, oblique on one side, to enable the bar to pass over them while being bent against the die, and abrupt on the other side, to resist the outward movement of the bar while being twisted, substantially as set forth.

13. The combination, with the die B, table C, and twisting-levers F F, of catches or pawls $g\,g$, projecting up through openings in the table in position to hold the bottom edge of the bar against the die during the twisting operation and adapted to move up and down, and a spring acting to press the catches up, substantially as set forth.

14. The combination, with the die B, table C, and twisting-levers F F, of spring-plates G G, arranged in recesses in the table, with their ends turned up to form catches $g\,g$, and plates $g''\,g''$, to cover said recesses, substantially as set forth.

15. The combination, with the table C and die B, of bending-rollers E E, moving back and forth along the sides of the die, twisting-levers F F, and bending-roller H, moving vertically past the edge of the table and adapted to turn down the overhanging ends of the bent bar, substantially as set forth.

16. The combination of the table C, die B, bending-rollers E E, twisting-levers F F, bending-roller H, moving in a vertical plane past the front of the table and adapted to turn down the overhanging ends of the bent bar, and the bending roller or rollers I, adapted to turn under the downwardly-projecting ends of the bar, substantially as set forth.

17. The combination of the table C, the die B, the bending-rollers E E, moving forward and backward along the sides of the die, the twisting-levers F F, adapted to turn down against the table, the bending-roller H, moving up and down past the front of the table, the bending-rollers I, moving backwardly beneath the edge of the table, and suitable mechanism for driving the several moving parts in succession and for causing each, after it has performed its work, to remain stationary, or nearly so, and hold the bar until the next successive part engages it, substantially as set forth.

18. The combination, with the table C and bed B, of bending-rollers E E, twisting-levers F F, bending-roller H, bending-rollers I, a driving-shaft, suitable intermediate mechanism for imparting motion to the several moving parts, and an automatic clutch through which the machine is driven, adapted, when engaged, to drive the machine until the several parts have executed each one complete movement and thereby formed one timber-hanger, and thereupon to disengage itself and stop the machine, substantially as set forth.

19. The combination, with the table C and die B and the bending or forming tools or devices E E, F F, H, and I, of the mechanism for operating said devices, consisting of shafts Q', P', R', and J, geared together and revolving at uniform speed and connected, respectively, to and imparting movement to the said forming tools or devices, substantially as set forth.

20. The combination, with die B, table C, and bending-rollers E E, of sliding frame T, carrying said rollers, rotating shaft Q', and a cam, O, on said shaft connected with said frame and constructed and adapted to push the frame forward a full stroke, then permit it to move back a half-stroke, hold it in such position for a time, and then permit it to complete its back-stroke all in one revolution of the cam, substantially as set forth.

21. The combination, with the die B, table C, and bending-rollers E E, of a sliding frame, T, carrying said rollers, a rotary shaft, Q', a cam, O, on said shaft, formed with a groove, $l$, a pin, $m$, engaging said groove, and a connecting-rod, $m'$, jointed to said frame at one end and carrying said pin at the other, and means, such as a spring or weight, for imparting to the frame T a rearward movement when released, substantially as set forth.

22. The combination, with the die B, table C, and bending-rollers E E, of a sliding frame, T, carrying said rollers, a shaft, Q', a cam, O, on said shaft, formed with a radial slot, $l$, having lateral notch $l'$ at the center of the cam and notch $l^2$ at the periphery thereof, a pin, $m$, entering said groove, a connecting-rod, $m'$, jointed to said frame at one end and carrying said pin at the other, whereby on the rotation of said cam the notch $l^2$ engages said pin and carries it forward a half-revolution until the pin drops out and slides back through the groove to the notch $l'$, where it rests during the remaining half-revolution, when it again drops out and slides back to the notch $l^2$, and means, such as a weight or spring, for imparting to the slide a tendency to move rearwardly, substantially as set forth.

23. The combination, with the die B and table C, of bending-rollers E E and mechanism for driving them, clamping-plunger D, adapted to hold the work against the rear end of the die while the rollers E E operate, sliding frame D', and revolving cam O, having peripheral cam-face $n$, for acting against said slide, substantially as set forth.

24. The combination, with table C, die B, and twisting-levers F F, of shaft P' and cams U U on said shaft, having each a spiral working-face engaging the ends of the levers F, and, as the cam revolves, pressing the latter down, substantially as set forth.

25. The combination, with the table C, die B, and twisting-levers F F, of shaft P' and cams U U on said shaft, each having a spiral working-face, $f'$, engaging the ends of the levers F, and, as the cam revolves, pressing the latter down, and a concentric face, $f^2$, for holding the levers down, substantially as set forth.

26. The combination, with table C, die B, and twisting-levers F F, of means, such as a weight or spring, for imparting to said levers a tendency to assume the vertical position, a shaft, P', and cams U U on said shaft, for pressing said levers down, whereby when said cams have passed the levers fly up of themselves, substantially as set forth.

27. The combination, with table C, of die B, vertical slide B', attached to said die, and having projection $v$, and shaft P', having cam-projection $v'$, whereby, as the shaft turns, the projection $v'$ takes under, lifts, and releases the projection $v$, and thereby lifts and drops the slide B' and die B, substantially as set forth.

28. The combination, with table C and roller H, of vertical sliding frame H', shaft R', cam V on said shaft, for lifting said frame, and cam or cams V' on said shaft, for pressing down said frame, substantially as set forth.

29. The combination, with table C and roller H, of frame H', made in sections sliding upon each other, in order to set the roller H higher or lower, and a filling-piece, $r^2$, for the direct transmission of the strain, with cam mechanism for moving said frame up and down, substantially as set forth.

30. The combination, with table C and roller H, of rollers I and shaft J, having radial arms $i\ i$, carrying said roller or rollers, substantially as set forth.

31. The combination, with table C, removable thickening-plate C', for altering the thickness of the table, and vertically-moving roller H, of rollers I, shaft J, having arms $i\ i$, carrying said rollers, and bearings I' I' for said shaft, adjustable vertically to adapt the rollers I to alterations in the thickness of the table, substantially as set forth.

32. The combination, with table C, means for varying its thickness, vertically-moving roller H, rollers I, shaft J, having arms $i\ i$, carrying said rollers, said shaft being vertically adjustable to adapt the rollers I to alterations in the thickness of the table, gear J' on said shaft, driving-gear P², from which said gear is driven, and idler-pinion $j$ between said wheels, with means for adjusting said pinion to different positions to adapt it to the changes in position of the gear J', substantially as set forth.

In witness whereof I have hereunto signed my name in the presence of two subscribing witnesses.

JACOB RUSSELL.

Witnesses:
ARTHUR C. FRASER,
ELBERT B. BOLTON.